United States Patent
Thadishetty

(10) Patent No.: US 9,893,882 B1
(45) Date of Patent: Feb. 13, 2018

(54) APPARATUS, SYSTEM, AND METHOD FOR DETECTING DEVICE TAMPERING

(71) Applicant: Juniper Networks, Inc., Sunnyvale, CA (US)

(72) Inventor: Venkanna Thadishetty, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 315 days.

(21) Appl. No.: 14/569,494

(22) Filed: Dec. 12, 2014

(51) Int. Cl.
*G06F 21/00* (2013.01)
*H04L 9/08* (2006.01)
*G06F 9/44* (2006.01)
*H04L 9/14* (2006.01)
*H04L 9/30* (2006.01)

(52) U.S. Cl.
CPC .......... *H04L 9/0822* (2013.01); *G06F 9/4406* (2013.01); *H04L 9/14* (2013.01); *H04L 9/30* (2013.01)

(58) Field of Classification Search
CPC ................................ G06F 21/00; G06F 21/10
USPC ...................................................... 726/26–30
See application file for complete search history.

(56) References Cited

U.S. PATENT DOCUMENTS

| 4,751,667 A * | 6/1988 | Ross ...................... G06F 21/79 713/187 |
| 7,051,211 B1 * | 5/2006 | Matyas, Jr. ............... H04L 9/08 380/201 |
| 2006/0230264 A1* | 10/2006 | Catherman ......... G06F 21/6209 713/155 |

OTHER PUBLICATIONS

Renesas Electronics Corp, "Board ID", http://am.renesas.com/products/security/boardid/child/solutions_child.jsp, as accessed on Oct. 21, 2014, (2010).

(Continued)

*Primary Examiner* — Anthony Brown
(74) *Attorney, Agent, or Firm* — FisherBroyles, LLP

(57) ABSTRACT

The disclosed apparatus may include a storage device that stores an asymmetric key pair including a public encryption key and a private encryption key assigned to a computing device. This apparatus may also include at least one processing unit communicatively coupled to the storage device. The processing unit may encrypt, via one key within the asymmetric key pair, a copy of identification information that identifies the computing device. The processing unit may then maintain the encrypted copy of the identification information and an unencrypted copy of the identification information in connection with the computing device. Next, the processing unit may detect evidence of device tampering in connection with the computing device by (1) decrypting, via another key within the asymmetric key pair, the encrypted copy of the identification information and (2) determining that the decrypted copy of the identification information differs from the unencrypted copy of the identification information.

20 Claims, 7 Drawing Sheets

(56) References Cited

OTHER PUBLICATIONS

Wikipedia, "Trusted Platform Nodule", http://en.wikipedia.org/wiki/Trusted_Platform_Module, as accessed Oct. 21, 2014, (Jul. 6, 2004).
Wikipedia, "Hash Function", http://en.wikipedia.org/wiki/Hash_function, as accessed Oct. 21, 2014, (Jan. 4, 2004).
Bare, J. Christopher "Attestation and Trusted Computing", https://courses.cs.washington.edu/courses/csep590/06wi/finalprojects/bare.pdf, as accessed Oct. 21, 2014, (Mar. 2006).
Wikipedia, "Public-key Cryptography", http://en.wikipedia.org/wiki/Public-key_cryptography, as accessed on Oct. 21, 2014, (Jan. 4, 2004).

* cited by examiner

Apparatus 100 ic information in connection with the computing device. Next, the processing unit may detect evidence of device tampering in connection with the computing device by (1) decrypting, via another key within the asymmetric key pair, the encrypted copy of the identification information and then (2) determining that the decrypted copy of the identification information differs from the unencrypted copy of the identification information.

APPARATUS, SYSTEM, AND METHOD FOR DETECTING DEVICE TAMPERING

BACKGROUND

Computing devices often store identification information that identifies certain properties and/or characteristics of the devices. For example, a computing device may dedicate a portion of memory to storing identification information that identifies the device's product type, serial number, and/or version. During each boot-up operation, an operating system of the device may access the identification information and then apply certain software and/or hardware configurations to the device based at least in part on the identification information.

Unfortunately, traditional storage technologies may have certain vulnerabilities that leave such identification information susceptible to alterations and/or tampering. For example, a traditional storage technology may fail to protect against malicious users falsifying the identification information in an attempt to replicate and/or clone a computing device. In another example, a traditional storage technology may fail to protect against a legitimate user inadvertently altering the identification information. Additionally or alternatively, a traditional storage technology may fail to protect against corruption of the data that includes the identification information.

In the event that such modifications to the identification information go undetected, the operating system of the device may be unable to properly execute certain functions and/or operations of the device. Additionally or alternatively, the device may provide incorrect information about the device's configuration to a remote device attempting to authenticate the device via remote attestation. The instant disclosure, therefore, identifies and addresses a need for improved apparatuses, systems, and methods for detecting device tampering.

SUMMARY

As will be described in greater detail below, the instant disclosure generally relates to apparatuses, systems, and methods for detecting device tampering. In one example, an apparatus for accomplishing such a task may include a storage device that stores an asymmetric key pair including a public encryption key and a private encryption key assigned to a computing device. This apparatus may also include at least one processing unit communicatively coupled to the storage device. The processing unit may encrypt, via one key within the asymmetric key pair, a copy of identification information that identifies the computing device. The processing unit may then maintain the encrypted copy of the identification information and an unencrypted copy of the identification information in connection with the computing device. Next, the processing unit may detect evidence of device tampering in connection with the computing device by (1) decrypting, via another key within the asymmetric key pair, the encrypted copy of the identification information and then (2) determining that the decrypted copy of the identification information differs from the unencrypted copy of the identification information.

Similarly, a system incorporating the above-described apparatus may include a Trusted Platform Module (TPM) chip that stores an asymmetric key pair including a public encryption key and a private encryption key assigned to a computing device. This system may also include at least one processing unit communicatively coupled to the TPM chip. The processing unit may encrypt, via one key within the asymmetric key pair, a copy of identification information that identifies the computing device. The processing unit may then maintain the encrypted copy of the identification information and an unencrypted copy of the identification information in connection with the computing device. Next, the processing unit may detect evidence of device tampering in connection with the computing device by (1) decrypting, via another key within the asymmetric key pair, the encrypted copy of the identification information and then (2) determining that the decrypted copy of the identification information differs from the unencrypted copy of the identification information.

A corresponding method may include encrypting a copy of identification information that identifies a computing device via an asymmetric key pair including a public encryption key and a private encryption key assigned to the computing device. This method may also include maintaining the encrypted copy of the identification information and an unencrypted copy of the identification information in connection with the computing device. Next, the method may include detecting evidence of device tampering in connection with the computing device by (1) decrypting, via another key within the asymmetric key pair, the encrypted copy of the identification information and then (2) determining that the decrypted copy of the identification information differs from the unencrypted copy of the identification information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
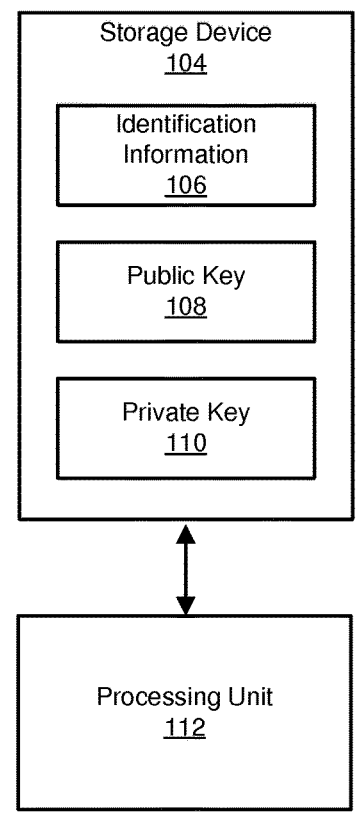
FIG. 1 is a block diagram of an exemplary apparatus for detecting device tampering.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for detecting device tampering. As will be explained in greater detail below, by encrypting (and subsequently decrypting) identification information that identifies a computing device via an asymmetric key pair assigned to the computing device, the various apparatuses, systems, and methods described herein may detect evidence of device tampering in connection with the computing device. For example, by securely encrypting a copy of the device's identification information and then decrypting the encrypted identification information in response to a request to verify or authenticate the device, the disclosed apparatuses, systems, and methods may enable an operating system of the device or an additional device to determine whether the original identification information has been altered. Specifically, the various apparatuses, systems, and methods described herein may compare a decrypted copy of identification information with an unencrypted copy of the identification information to determine whether the identification information was altered after having been encrypted.

As such, the disclosed apparatuses, systems, and methods may provide various security services to users of devices with embedded private keys (e.g., devices containing TPM chips). These security services may include verifying the legitimacy of devices' identification information during boot-up operations and/or during remote attestation sessions with remote devices.

Figure 2:
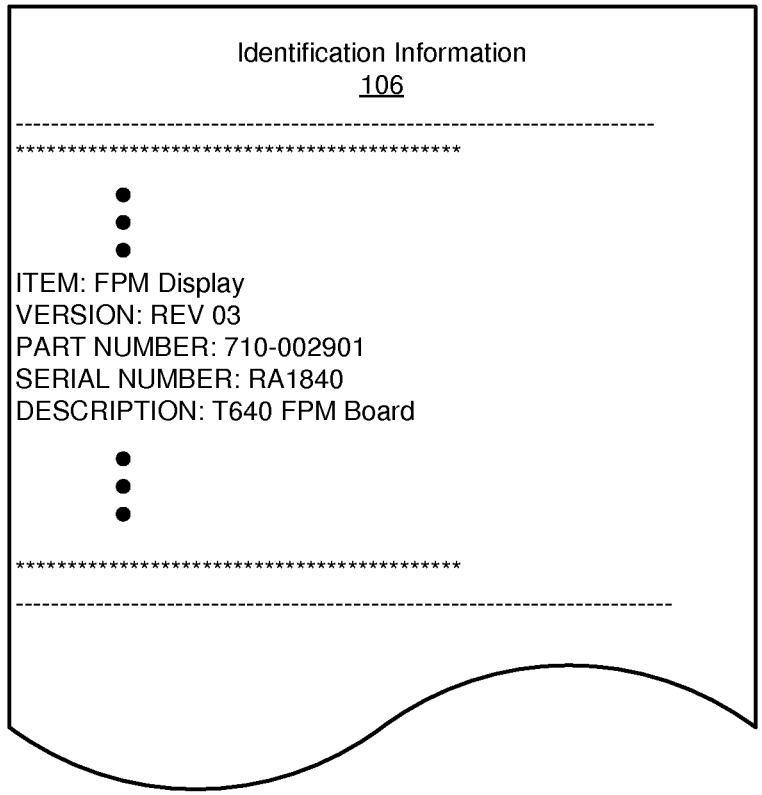
FIG. 2 is an illustration of an exemplary copy of identification information that identifies a computing device.
Figure 3:
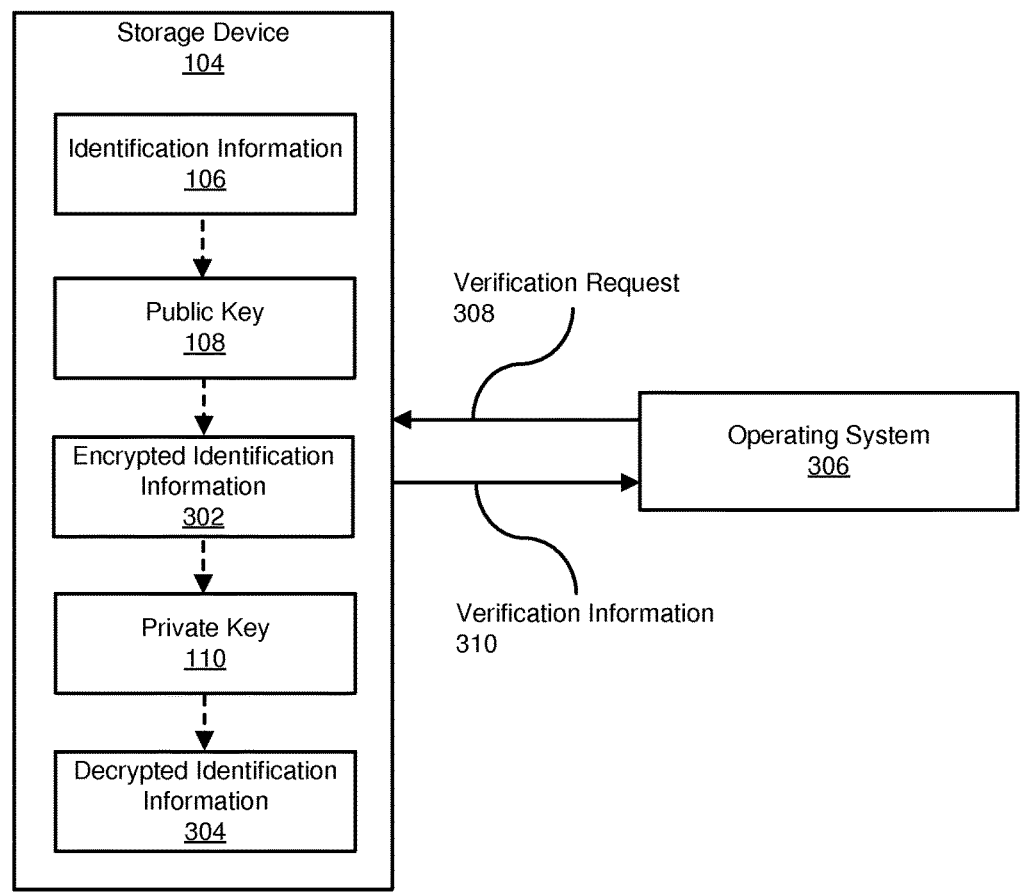
FIG. 3 is a block diagram of an exemplary apparatus for detecting device tampering.
Figure 4:
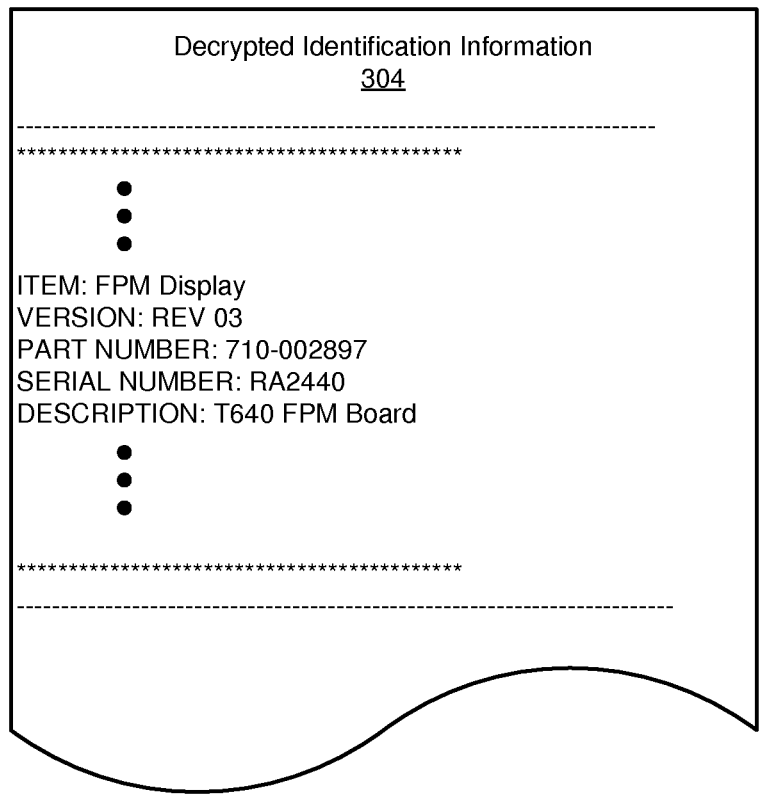
FIG. 4 is an illustration of an exemplary decrypted copy of identification information that identifies a computing device.
Figure 5:
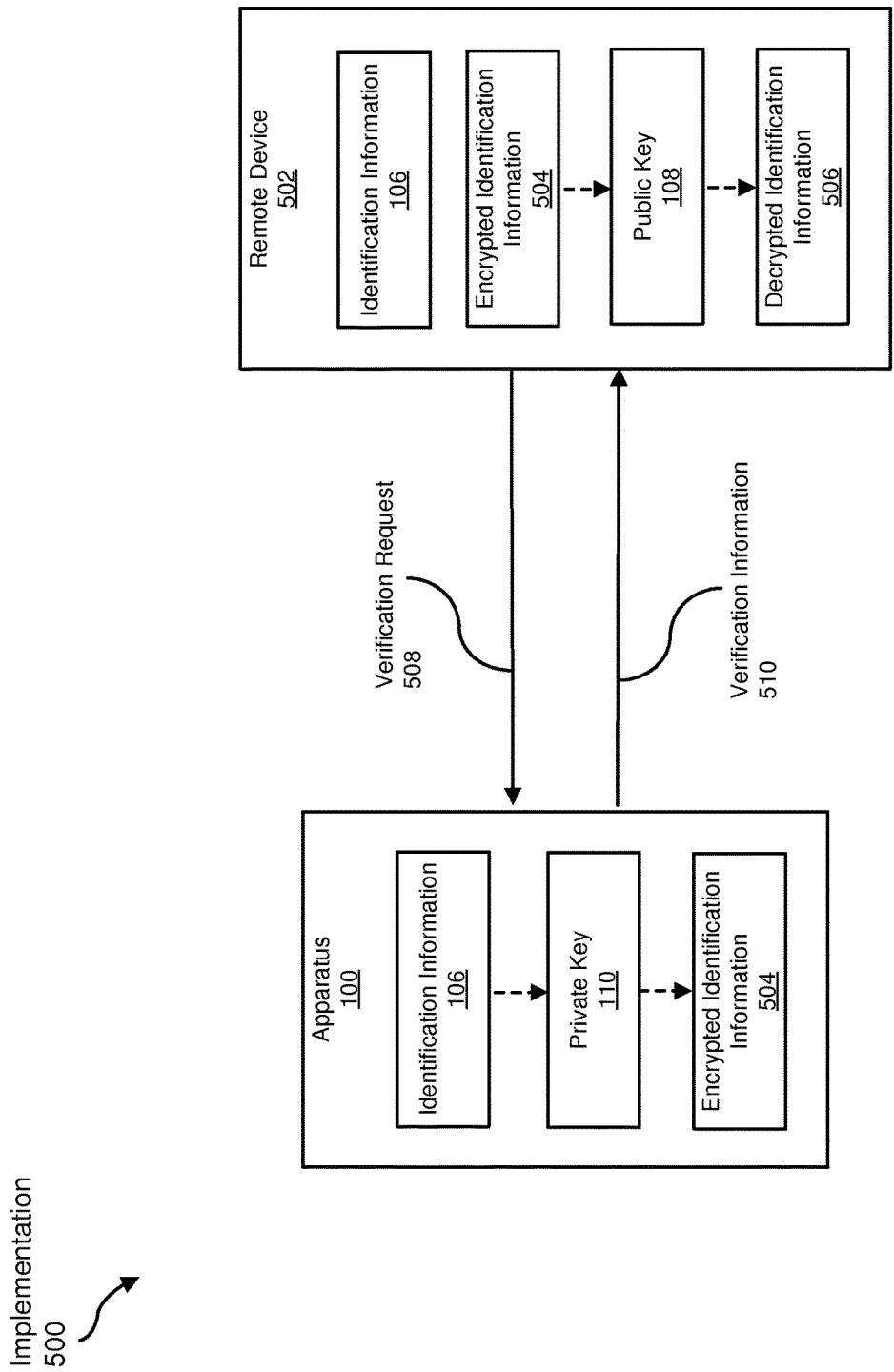
FIG. 5 is a block diagram of an exemplary implementation for detecting device tampering.

The following will provide, with reference to FIGS. 1, 3, and 5, detailed descriptions of exemplary apparatuses that facilitate detecting device tampering. The discussion corresponding to FIGS. 2 and 4 will provide detailed descriptions of an exemplary unencrypted copy of identification information that identifies a device and an exemplary decrypted copy of the identification information that identifies the device, respectively. The discussion corresponding to FIG. 5 will provide a detailed description of an exemplary implementation that facilitates detecting device tampering. The discussion corresponding to FIG. 6 will provide a detailed description of an exemplary method for detecting device tampering. Finally, the discussion corresponding to FIG. 7 will provide numerous examples of systems that may include the apparatus shown in FIG. 1.

FIG. 1 shows a block diagram of an exemplary apparatus 100 for detecting device tampering. The term "device tampering," as used herein, generally refers to any type or form of process or procedure that alters, harms, and/or otherwise interferes with the configuration, operation, and/or security of a computing device without the consent of a legitimate user of the device. In one example, device tampering may involve modifying the contents of a memory or storage device within a computing device. More specifically, device tampering may involve modifying identification information that identifies a computing device. Additionally or alternatively, device tampering may be performed non-maliciously (e.g., inadvertently) or maliciously (e.g., as part of an attempt to portray or masquerade one computing device as another).

As illustrated in FIG. 1, apparatus 100 may include a storage device 104. The term "storage device," as used herein, generally refers to any type or form of digital memory capable of storing, recording, and/or accessing data. In some examples, storage device 104 may represent an external storage device (e.g., an external hard drive or server). In other examples, storage device 104 may represent an internal storage device (e.g., an internal hard drive or portion of Random Access Memory (RAM) or Read-Only Memory (ROM) within apparatus 100). In an exemplary embodiment, storage device 104 may contain a portion of Electrically Erasable Programmable Read Only-Memory (EEPROM) specifically configured to store unencrypted, encrypted, and/or decrypted identification information that identifies a computing device.

Accordingly, as illustrated in FIG. 1, storage device 104 may include identification information 106. The term "identification information," as used herein, generally refers to any type or form of data that indicates and/or identifies one or more properties, features, and/or characteristics of a computing device. Examples of identification information 106 include, without limitation, a serial number of a device, a product type/number of a device, a software/hardware configuration of a device, variations of one or more of the same, combinations of one or more of the same, or any other suitable identification information.

As an example, FIG. 2 illustrates identification information 106. Notably, identification information 106 in FIG. 2 may represent an unencrypted version of the identification information of apparatus 100. As shown in FIG. 2, identification information 106 may indicate the item type of apparatus 100 (in this example, "FPM display"), the version of apparatus 100 (in this example, "REV 03"), the part number of apparatus 100 (in this example, "710-002901"), the serial number of apparatus 100 (in this example, "RA1840"), and a description of apparatus 100 (in this example, "T640 FPM Board"). Identification information 106 may also include any additional information that describes or identifies one or more portions of apparatus 100. In some examples, storage device 104 may be automatically programmed with identification information 106 during the manufacture of apparatus 100. Additionally or alternatively, a user of apparatus 100 may program storage device 104 with identification information 106.

Returning to FIG. 1, storage device 104 may also include one or more cryptographic keys, such as public key 108 and private key 110. In one example, public key 108 and private key 110 may represent the keys included within an asymmetric key pair. The term "asymmetric key pair," as used herein, generally refers to a pair of inverse cryptographic algorithms used to securely encrypt and/or decrypt data. Private key 110 may represent a confidential key within the asymmetric key pair. Accordingly, private key 110 may only be known to certain authorized entities.

In contrast, public key 108 may be readily accessed by any entity. Moreover, data encrypted using one key within the asymmetric key pair may be decrypted using the other key within the asymmetric key pair. Examples of asymmetric key pairs include, without limitation, RSA key pairs, Secure Hash Algorithm (SHA) key pairs, variations of one or more of the same, or any other suitable key pairs.

In some examples, public key 108 and private key 110 may be assigned to and/or stored within storage device 104. In these examples, storage device 104 may store and/or protect private key 110 such that unauthorized entities (e.g., remote computing devices and/or malicious users) are unable to access private key 110. In contrast, storage device 104 may provide remote computing devices with access to public key 108. For example, storage device 104 may send public key 108 to a remote device upon request. Additionally or alternatively, a remote device may access public key 108 within a database that stores public keys associated with particular devices.

In some embodiments, public key 108 and private key 110 may be stored in separate locations within storage device 104 and/or an additional storage device within apparatus 100. For example, public key 108 and private key 110 may be stored in separate storage devices in order to prevent a user or device from accessing both public key 108 and private key 110. In one example, public key 108 may be stored within an operating system of apparatus 100. In this way, the operating system of apparatus 100 may use public key 108 to decrypt information encrypted with private key 110 (e.g., in response to a request to verify the legitimacy of the information encrypted with private key 110). In this example, private key 110 may be stored in a separate, secure location that is not accessible by the operating system of apparatus 100.

In some examples, public key 108 and/or private key 110 may be stored together within a device or portion of code specifically configured to provide and/or store one or more secure cryptographic keys. Specifically, all or a portion of storage device 104 may represent a TPM chip. The term "TPM chip," as used herein, generally refers to any type or form of microprocessor or computing platform that integrates cryptographic keys into computing devices. A TPM chip may be encoded with a unique private key (and a corresponding public key) during manufacture in order to reduce the risk of an unauthorized party accessing the private key. In addition to storing and securing cryptographic keys, a TPM chip may be used to maintain unencrypted, encrypted, and/or decrypted copies of identification information that identifies the computing device that includes the TPM chip.

As shown in FIG. 1, apparatus 100 may additionally include a processing unit 112. Processing unit 112 may represent any device capable of managing, accessing, and/or distributing the data stored within storage device 104. In the example of FIG. 1, processing unit 112 may be communicatively coupled to storage device 104 (e.g., processing unit 112 may reside outside of the TPM chip that stores public key 108 and private key 110). In other examples, processing unit 112 may reside within storage device 104. Additionally or alternatively, storage device 104 may reside within processing unit 104.

Exemplary apparatus 100 in FIG. 1 may be implemented in a variety of ways. For example, all or a portion of exemplary apparatus 100 may represent portions of exemplary apparatus 300 in FIG. 3. In this example, apparatus 300 may include storage device 104, identification information 106, public key 108, and private key 110 illustrated in FIG. 1. In addition, apparatus 300 may include processing unit 112 (although not shown in FIG. 3).

Moreover, apparatus 300 may include an encrypted copy of identification information 302 and a decrypted copy of identification information 304 within storage device 104. As indicated by way of the dashed arrows illustrated in FIG. 3, encrypted copy of identification information 302 may be generated by encrypting identification information 106 with public key 108. In addition, decrypted copy of identification information 304 may be generated by decrypting encrypted copy of identification information 302 with private key 110.

As an example, FIG. 4 illustrates decrypted copy of identification information 304. As shown in FIG. 4, decrypted copy of identification information 304 may indicate the item type of apparatus 300 (in this example, "FPM display"), the version of apparatus 300 (in this example, "REV 03"), the part number of apparatus 300 (in this example, "710-002897"), the serial number of apparatus 300 (in this example, "RA2440"), and a description of apparatus 300 (in this example, "T640 FPM Board"). Notably, decrypted copy of identification information 304 in FIG. 4 may identify and/or describe the same apparatus (e.g., apparatus 100) as identification information 106 in FIG. 2. However, decrypted copy of identification information 304 in FIG. 4 and identification information 106 in FIG. 2 may differ in one or more places and/or aspects (e.g., the part numbers and/or serial numbers may differ).

Returning to FIG. 3, apparatus 300 may include an operating system 306 in communication with storage device 104. In this example, operating system 306 may send a verification request 308 to storage device 104. As will be explained in greater detail below, storage device 104 and/or processing unit 112 may send verification information 310 to operating system 306 in response to verification request 308.

The term "verification request," as used herein, generally refers to any type or form of electronic message or communication that requests confirmation or validation of the legitimacy or integrity of a computing device or information stored within a computing device. In an exemplary embodiment, a verification request may request verification of information that identifies a computing device or apparatus. In one example, a verification request may be generated by and/or sent to internal components of a computing device. In another example, one device may remotely (via, e.g., a network connection) send a verification request to another device.

In addition, the term "verification information," as used herein, generally refers to any type or form of electronic message, communication, and/or data that may be used to determine the legitimacy or integrity of a computing device or information stored within a computing device. In one example, verification information may simply include confirmation that the identification information of a computing device is legitimate and/or uncompromised. In another example, verification information may include information used to perform a verification procedure. In this example, the verification information may include and/or represent an unencrypted copy of identification information, an encrypted copy of identification information, and/or one or more cryptographic keys used to decrypt an encrypted copy of identification information.

As another example, all or a portion of exemplary apparatus 100 may represent portions of exemplary implementation 500 in FIG. 5. In this example, implementation 500 may include apparatus 100, which includes identification information 106 and private key 110 illustrated in FIG. 1. Implementation 500 may also include storage device 104 and/or processing unit 112 in communication with storage device 104.

In addition, implementation 500 may include an encrypted copy of identification information 504. In this example, encrypted copy of identification information 504 may be generated by encrypting identification information 106 with private key 110. Moreover, implementation 500 may include a remote device 502 in communication (via, e.g., a network connection) with storage device 104. In one example, remote device 502 may send a verification request 508 to storage device 104. In response to verification request 508, storage device 104 and/or processing unit 112 may send verification information 510 to remote device 502. Verification information 510 may include a portion of the data illustrated within remote device 502, such as identification information 106, encrypted copy of identification information 504, and/or public key 108. In some examples, remote device 502 may generate a decrypted copy of identification information 506 by decrypting encrypted copy of identification information 504 with public key 108.

As explained in connection with FIGS. 1-5, a device may store information that identifies one or more properties of the device. The device may also store an asymmetric cryptographic key pair that is assigned to the device. By encrypting and/or decrypting the identification information stored within the device, exemplary apparatuses 100 and 300 and/or exemplary implementation 500 may help detect evidence of device tampering in connection with the device. For example, any of the disclosed apparatuses and/or implementations may determine whether a decrypted copy of identification information (such as the decrypted identification information illustrated within FIG. 4) matches an unencrypted copy of the identification information (such as the identification information illustrated within FIG. 2). In the event that the decrypted copy of the identification information does not match the unencrypted copy of the identification information, the disclosed apparatuses and/or implementations may determine that the identification information was tampered with and/or or altered inadvertently or maliciously (e.g., as part of an attempt to clone another device) after the original identification information was encrypted. As such, the apparatuses, systems, and methods described herein may help users of computing devices determine whether the devices have been modified, tampered with, and/or otherwise compromised.

Figure 6:
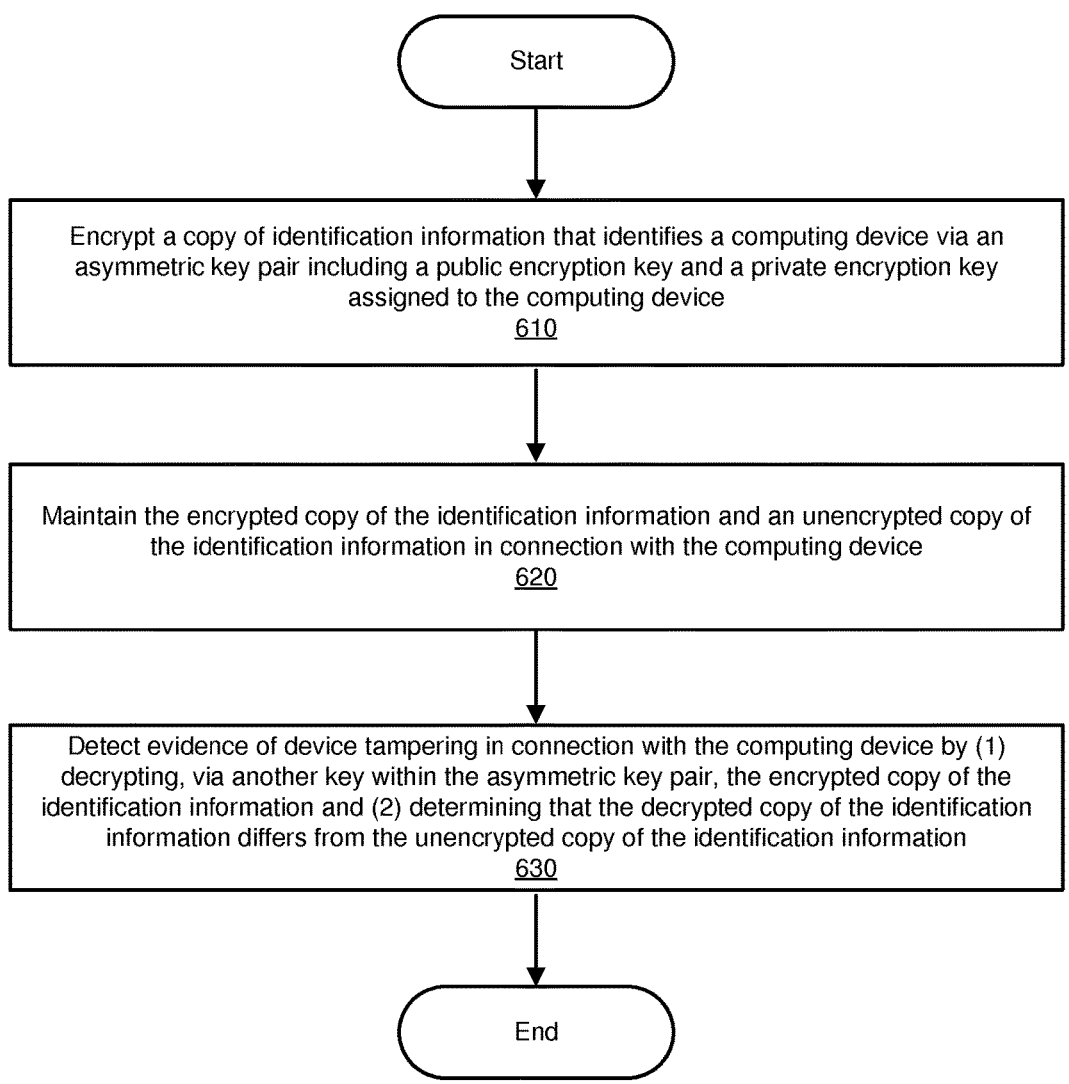
FIG. 6 is a flow diagram of an exemplary method for detecting device tampering.

FIG. 6 is a flow diagram of an exemplary method 600 for detecting device tampering. Method 600 may include the step of encrypting a copy of identification information that identifies a computing device via an asymmetric key pair including a public encryption key and a private encryption key assigned to the computing device (610). This encrypting step may be performed in a variety of ways. In the example of FIG. 3, processing unit 112 may encrypt identification information 106 via public key 108. In this example, processing unit 112 may encrypt identification information 106 in response to determining that identification information 106 has been entered into and/or stored within storage device 104. Notably, processing unit 112 may encrypt identification information 106 at any point in time before a potentially malicious user is able to access identification information 106. In this way, processing unit 112 may ensure that encrypted copy of identification information 302 represents legitimate, accurate identification information associated with apparatus 300.

Referring to the example of FIG. 5, processing unit 112 may encrypt identification information 106 via private key 110. In this example, processing unit 112 may encrypt identification information 106 in response to determining that identification information 106 has been entered into and/or stored within storage device 104, as discussed above in connection with FIG. 3. In another example, processing unit 112 may encrypt identification information 106 in response to receiving a request (e.g., from remote device 502) to encrypt and/or verify identification information 106.

In some examples, processing unit 112 may compute a hash of identification information 106 (e.g., by applying a hash function to identification information 106) prior to encrypting identification information 106. The term "hash function," as used herein, generally refers to any process or algorithm that transforms data of an arbitrary size into data of a fixed size. In addition, a hash function may produce a unique output for each unique input. Examples of hash functions include, without limitation, Berkeley Software Distribution (BSD) checksums, SYSV checksums, BLAKE-256 hash functions, MD2 hash functions, Pearson hash functions, Jenkins hash functions, and/or any additional type of hash function.

In some embodiments, processing unit 112 may utilize a hash function to produce a shorter digest and/or representation of identification information 106. Processing unit 112 may then encrypt (with either public key 108 or private key 110) the hash of identification information 106 to produce a signature of identification information 106. In this way, processing unit 112 may improve the overall efficiency of verifying identification information 106 since encrypting/decrypting a hash of a portion of data may involve less time and/or computing resources than encrypting/decrypting the original portion of data.

Returning to FIG. 6, method 600 may also include the step of maintaining the encrypted copy of the identification information and an unencrypted copy of the identification information in connection with the computing device (620). This maintaining step may be performed in a variety of ways. In the examples of FIGS. 3 and 5, processing unit 112 may store identification information 106 within storage device 104. In general, processing unit 112 may store identification information 106 within any suitable storage device such that identification information 106 may be efficiently accessed and/or retrieved. Similarly, processing unit 112 may store encrypted copy of identification information 302 and/or encrypted copy of identification information 504 within storage device 104 (or any suitable storage device). In an exemplary embodiment, processing unit 112 may store the signature(s) of identification information 106 within a TPM chip included within storage device 104.

Method 600 in FIG. 6 may additionally include a step of detecting evidence of device tampering in connection with the computing device by (1) decrypting, via another key within the asymmetric key pair, the encrypted copy of the identification information and (2) determining that the decrypted copy of the identification information differs from the unencrypted copy of the identification information (630). This detecting step may be performed in a variety of ways.

In the example of FIG. 3, processing unit 112 may detect the evidence of device tampering in response to receiving a request from operating system 306 to verify the legitimacy of identification information 106. Specifically, processing unit 112 may receive a request to verify the legitimacy of identification information 106 during a boot-up operation on apparatus 300. For example, a bootloader program within operating system 306 may be configured to access identification information 106 during each boot-up operation of apparatus 300 in order to configure appropriate settings, software, and/or hardware corresponding to the product type, product number, and/or version of apparatus 300. In the example of FIG. 3, in addition to requesting access to identification information 106, operating system 306 may prompt (via verification request 308) the TPM chip included in storage device 104 to verify identification information 106.

In response to receiving verification request 308, processing unit 112 may attempt to verify the legitimacy of identification information 106. For example, processing unit 112 may decrypt (or direct the TPM chip included in storage device 104 to decrypt) encrypted copy of identification information 302 using private key 110. As previously mentioned, decrypting encrypted copy of identification information 302 via private key 110 may generate decrypted copy of identification information 304. Processing unit 112 may then attempt to verify the legitimacy of identification information 106 by comparing decrypted copy of identification information 304 with identification information 106.

In some examples, processing unit 112 may detect the evidence of device tampering while comparing decrypted copy of identification information 304 with identification information 106. As previously mentioned, processing unit 112 may determine that decrypted copy of identification information 304 and identification information 106 differ in one or more places and/or aspects. For example, processing unit 112 may determine that identification information 106 identifies a part number of "710-002901" while decrypted copy of identification information 304 identifies a part number of "710-002897." In addition, processing unit 112 may determine that identification information 106 identifies a serial number of "RA1840" while decrypted copy of identification information 304 identifies a serial number of "RA2440."

As such, processing unit 112 may determine that a user or other entity has tampered with identification information 106 at some point in time after identification information 106 was encrypted. For example, processing unit 112 may determine that identification information 106 was altered inadvertently (due, e.g., to a corrupted file). Additionally or alternatively, processing unit 112 may determine that a malicious user altered data within identification information 106 in order to portray and/or masquerade apparatus 300 as a device manufactured by a different enterprise. For example, processing unit 112 may determine that decrypted copy of identification information 304 identifies apparatus 300 as a product of one enterprise while identification information 106 identifies apparatus 300 as a product of another enterprise. As a result, processing unit 112 may determine that a malicious user is attempting to portray apparatus 300 as a product of the other enterprise.

In the event that processing unit 112 generated encrypted copy of identification information 302 by encrypting a hash of identification information 106, processing unit 112 may decrypt the encrypted hash. In some examples, processing unit 112 may then reverse the decrypted hash to compare the decrypted hash with identification information 106. Alternatively, processing unit 112 may generate a hash of identification information 106 and compare the hash of identification information 106 with the decrypted hash to identify any discrepancies between the hash of identification information 106 and the decrypted hash.

In response to detecting the evidence of device tampering, processing unit 112 may perform (or may direct operating system 306 to perform) one or more security actions in order to prevent further device tampering. In some examples, processing unit 112 may alert operating system 306 about the detection of the evidence of device tampering by sending verification information 310 to operating system 306. Verification information 310 may include a variety of information about the evidence of device tampering, such as the specific identification information details that were altered and/or recommended security actions to take in response to the detection of the evidence of device tampering.

In some examples, receiving verification information 310 may prompt operating system 306 to alert a user of apparatus 300 about the detection of the evidence of device tampering (via, e.g., a graphical user interface). Additionally or alternatively, verification information 310 may prompt operating system 306 to prevent a user of apparatus 300 from accessing all or a portion or apparatus 300. For example, operating system 306 may lock down and/or quarantine any sensitive information stored within apparatus 300 in response to a determination that apparatus 300 has potentially been compromised. Processing unit 112 and/or operating system 306 may perform any number of additional security actions, such as alerting an enterprise or administrator associated with apparatus 300 about the evidence of device tampering and/or requiring a user to enter appropriate authentication credentials before accessing all or a portion of apparatus 300.

In some embodiments, processing unit 112 may determine that decrypted copy of identification information 304 represents accurate, verified identification information of apparatus 300. For example, processing unit 112 may determine that decrypted copy of identification information 304 represents and/or matches the original identification information stored within apparatus 300 based at least in part on the ability to decrypt encrypted copy of identification information 302 with private key 110. In some examples, processing unit 112 may determine that decrypted copy of identification information 304 represents the original identification information stored within apparatus 300 regardless of whether the current identification information 106 matches decrypted copy of identification information 304. In these examples, processing unit 112 may supply decrypted copy of identification information 304 to operating system 306 to enable operating system 306 to extract the necessary information to boot-up and/or properly operate apparatus 300. In this way, the apparatuses, systems, and methods described herein may ensure that devices are provided with accurate, verified identification information during boot-up operations even in the event that the original identification information has been modified or corrupted.

In addition to or instead of receiving verification request 308 from operating system 306, processing unit 112 may receive verification request 508 from a remote device (e.g., remote device 502 in FIG. 5). In one example, processing unit 112 may determine that verification request 508 simply includes a request to verify the legitimacy of identification information 106. In other examples, processing unit 112 may determine that verification request 508 includes a request for remote attestation of apparatus 300. The term "remote attestation," as used herein, generally refers to any procedure or process for verifying the software and/or hardware configuration of a computing device by a device external to the computing device. In some examples, verification request 508 may include a typical remote attestation request to verify the software/hardware configuration of apparatus 300 and/or a request to verify the legitimacy of identification information 106. Specifically, verification request 508 may include a request to verify the signature of encrypted copy of identification information 504.

In some embodiments, processing unit 112 may enable remote device 502 to attempt to verify the legitimacy of identification information 106 in response to receiving verification request 508. For example, processing unit 112 may send verification information 510 to remote device 502. Verification information 510 may include a variety of information, such as identification information 106, public key 108, and/or encrypted copy of identification information 504. Verification information 510 may also include any additional information typically associated with remote attestation, such as the configuration of certain software and/or hardware within apparatus 300. Notably, verification information 510 may exclude private key 110, as only the TPM chip within storage device 104 has access to private key 110 in this example.

By sending verification information 510 to remote device 502, processing unit 112 may enable remote device 502 to decrypt encrypted copy of identification information 504 via public key 108. As previously mentioned, decrypting encrypted copy of identification information 504 via public key 108 may generate decrypted copy of identification information 506. After generating decrypted copy of identification information 506, remote device 502 may attempt to verify the legitimacy of identification information 106 by comparing decrypted copy of identification information 506 with identification information 106. In this example, like the example of FIG. 3, remote device 502 may detect evidence of device tampering by determining that decrypted copy of identification information 506 and identification information 106 differ in one or more ways.

In response to detecting the evidence of device tampering, remote device 502 may perform one or more security actions to prevent the corruption of apparatus 100 from interfering with the operation of remote device 502. For example, remote device 502 may cease and/or block communication with apparatus 100. In addition, remote device 502 may perform any of the security actions previously described in connection with FIG. 3, such as preventing a user of apparatus 300 from accessing all or a portion of apparatus 300 and/or alerting a user of apparatus 300 about the detection of the evidence of device tampering.

Figure 7:
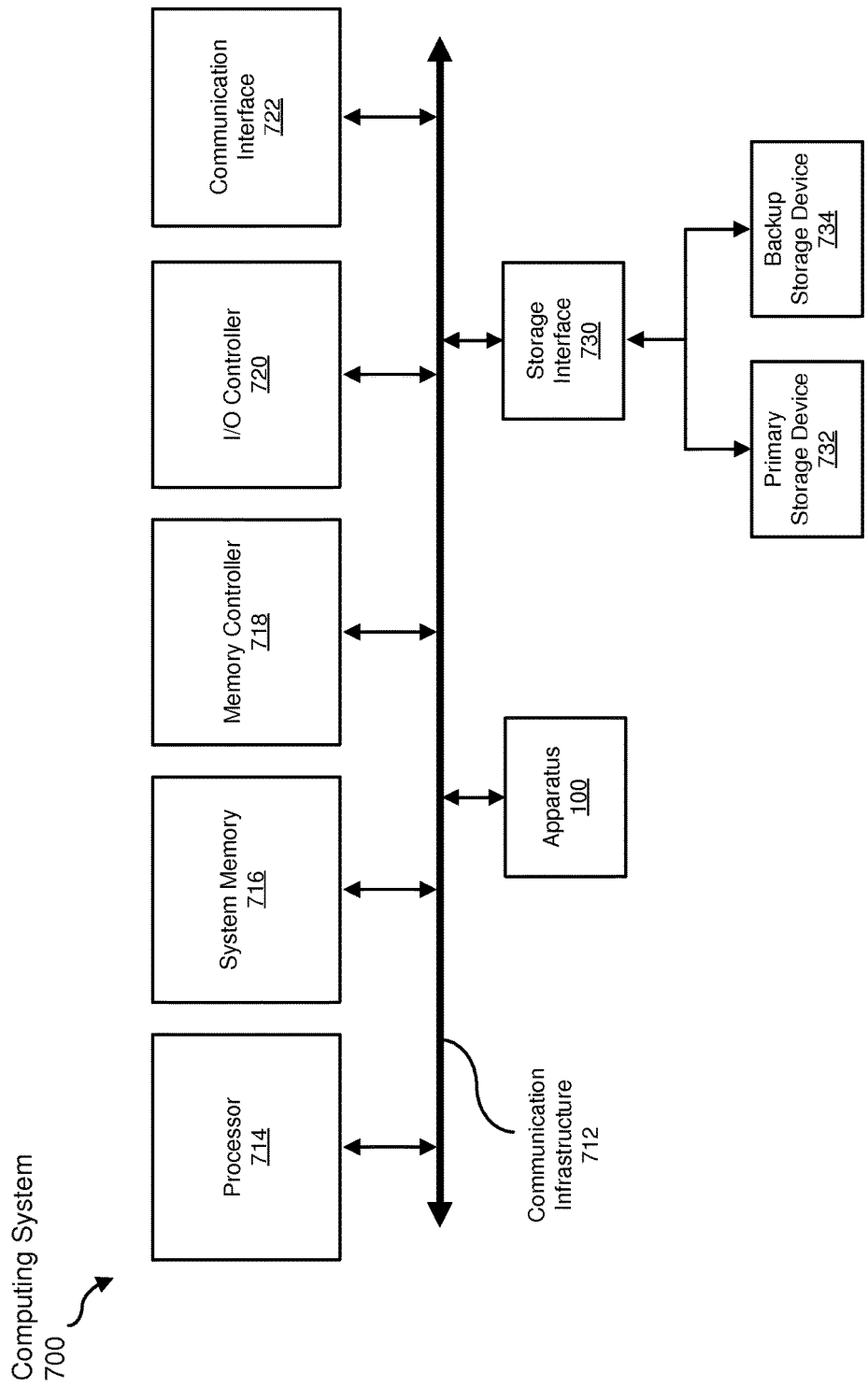
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 6. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, RAM, ROM, flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   at least one storage device that stores an asymmetric key pair comprising a public encryption key and a private encryption key assigned to a computing device; and
   at least one processing unit communicatively coupled to the storage device, wherein the processing unit:
      encrypts, via one key within the asymmetric key pair, a copy of identification information that identifies the computing device;
      maintains the encrypted copy of the identification information and an unencrypted copy of the identification information in connection with the computing device; and
      detects evidence of device tampering in connection with the computing device by:
         decrypting, via another key within the asymmetric key pair, the encrypted copy of the identification information;
         determining that the decrypted copy of the identification information differs from the unencrypted copy of the identification information; and
         determining, based on the decrypted copy of the identification information differing from the unencrypted copy of the identification information, that the unencrypted copy of the identification information has been illegitimately modified as part of an attempt to falsely portray the identity of the computing device.

2. The apparatus of claim 1, wherein the storage device comprises a Trusted Platform Module (TPM) chip.

3. The apparatus of claim 2, wherein:
   the private encryption key comprises a unique private encryption key; and
   the TPM chip stores the unique private encryption key.

4. The apparatus of claim 1, wherein the private encryption key is stored in a separate location than the public encryption key.

5. The apparatus of claim 1, wherein the processing unit:
   receives a request from an operating system of the computing device to verify the legitimacy of the identification information;
   attempts to verify the legitimacy of the identification information; and
   detects the evidence of device tampering while attempting to verify the legitimacy of the identification information.

6. The apparatus of claim 5, wherein the operating system of the computing device initiates the request to verify the legitimacy of the identification information during a boot-up operation on the computing device.

7. The apparatus of claim 5, wherein:
   the processing unit encrypts the copy of the identification information via the public encryption key; and
   the processing unit decrypts the encrypted copy of the identification information via the private encryption key.

8. The apparatus of claim 1, wherein the processing unit:
   receives a request from a remote device to verify the legitimacy of the identification information via remote attestation;
   attempts to verify the legitimacy of the identification information via remote attestation; and
   detects the evidence of device tampering while attempting to verify the legitimacy of the identification information via remote attestation.

9. The apparatus of claim 8, wherein the processing unit sends, in response to the request from the remote device, the encrypted copy of the identification information to the remote device to enable the remote device to decrypt the encrypted copy of the identification information.

10. The apparatus of claim 9, wherein:
    the processing unit encrypts the copy of the identification information via the private encryption key; and
    the processing unit provides the remote device with access to the public encryption key to enable the remote device to decrypt the encrypted copy of the identification information.

11. The apparatus of claim 1, wherein the processing unit performs at least one security action in response to determining that the decrypted copy of the identification information differs from the unencrypted copy of the identification information.

12. The apparatus of claim 11, wherein the security action comprises at least one of:
    preventing a user of the computing device from accessing at least a portion of the computing device; and
    alerting a user of the computing device about the detection of the evidence of device tampering.

13. A system comprising:
    a TPM chip that stores an asymmetric key pair comprising a public encryption key and a private encryption key assigned to a computing device; and
    at least one processing unit communicatively coupled to the TPM chip, wherein the processing unit:
       encrypts, via one key within the asymmetric key pair, a copy of identification information that identifies the computing device;
       maintains the encrypted copy of the identification information and an unencrypted copy of the identification information in connection with the computing device; and
       detects evidence of device tampering in connection with the computing device by:
          decrypting, via another key within the asymmetric key pair, the encrypted copy of the identification information;
          determining that the decrypted copy of the identification information differs from the unencrypted copy of the identification information; and
          determining, based on the decrypted copy of the identification information differing from the unencrypted copy of the identification information, that the unencrypted copy of the identification information has been illegitimately modified as part of an attempt to falsely portray the identity of the computing device.

14. The system of claim 13, wherein:
    the private encryption key comprises a unique private encryption key; and
    the TPM chip stores the unique private encryption key.

15. The system of claim 13, wherein the processing unit:
receives a request from an operating system of the computing device to verify the legitimacy of the identification information;
attempts to verify the legitimacy of the identification information; and
detects the evidence of device tampering while attempting to verify the legitimacy of the identification information.

16. The system of claim 15, wherein:
the processing unit encrypts the copy of the identification information via the public encryption key; and
the processing unit decrypts the encrypted copy of the identification information via the private encryption key.

17. The system of claim 13, wherein the processing unit:
receives a request from a remote device to verify the legitimacy of the identification information via remote attestation;
attempts to verify the legitimacy of the identification information via remote attestation; and
detects the evidence of device tampering while attempting to verify the legitimacy of the identification information via remote attestation.

18. The system of claim 17, wherein the processing unit sends, in response to the request from the remote device, the encrypted copy of the identification information to the remote device to enable the remote device to decrypt the encrypted copy of the identification information.

19. The system of claim 18, wherein:
the processing unit encrypts the copy of the identification information via the private encryption key; and
the processing unit provides the remote device with access to the public encryption key to enable the remote device to decrypt the encrypted copy of the identification information.

20. A method comprising:
encrypting a copy of identification information that identifies a computing device via an asymmetric key pair comprising a public encryption key and a private encryption key assigned to the computing device;
maintaining the encrypted copy of the identification information and an unencrypted copy of the identification information in connection with the computing device; and
detecting evidence of device tampering in connection with the computing device by:
  decrypting, via another key within the asymmetric key pair, the encrypted copy of the identification information;
  determining that the decrypted copy of the identification information differs from the unencrypted copy of the identification information; and
  determining, based on the decrypted copy of the identification information differing from the unencrypted copy of the identification information, that the unencrypted copy of the identification information has been illegitimately modified as part of an attempt to falsely portray the identity of the computing device.

* * * * *